(12) United States Patent
Sabbatino et al.

(10) Patent No.: US 8,066,437 B2
(45) Date of Patent: Nov. 29, 2011

(54) OPTICAL TRANSCEIVER MODULE PROVIDING EMI SHIELDING AND ELECTRICAL ISOLATION BETWEEN A SIGNAL GROUND AND A CHASSIS GROUND

(75) Inventors: Salvatore Sabbatino, Cafasse (IT); Chenyuan Liu, Cafasse (IT); Silvio Lupo, Turin (IT)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 127 days.

(21) Appl. No.: 12/403,208

(22) Filed: Mar. 12, 2009

(65) Prior Publication Data

US 2010/0232749 A1 Sep. 16, 2010

(51) Int. Cl.
*G02B 6/36* (2006.01)
(52) U.S. Cl. ............... 385/92; 385/88; 385/93; 385/94
(58) Field of Classification Search ............ 385/92–94, 385/88
See application file for complete search history.

(56) References Cited

U.S. PATENT DOCUMENTS

| | | | |
|---|---|---|---|
| 4,733,936 A * | 3/1988 | Mikolaicyk et al. ............ 385/61 |
| 5,895,240 A | 4/1999 | Chuang et al. | |
| 6,108,478 A | 8/2000 | Harpin et al. | |
| 6,206,582 B1 * | 3/2001 | Gilliland ........................ 385/92 |
| 6,293,710 B1 * | 9/2001 | Lampert et al. ................ 385/78 |
| 6,316,281 B1 | 11/2001 | Lee et al. | |
| 6,540,412 B2 | 4/2003 | Yonemura et al. | |
| 6,628,852 B2 | 9/2003 | House et al. | |
| 6,796,719 B2 * | 9/2004 | Zhu et al. ........................ 385/76 |
| 6,870,238 B2 | 3/2005 | Exposito et al. | |
| 6,874,953 B2 | 4/2005 | Dair et al. | |
| 7,213,980 B2 | 5/2007 | Oki et al. | |
| 7,261,473 B2 | 8/2007 | Owen et al. | |
| 2005/0058406 A1 | 3/2005 | Reilly et al. | |
| 2005/0286838 A1 | 12/2005 | Oki et al. | |
| 2007/0274643 A1 | 11/2007 | Okada | |
| 2008/0031634 A1 | 2/2008 | Nguyen et al. | |
| 2009/0092361 A1 * | 4/2009 | Bogdan .......................... 385/92 |
| 2009/0175582 A1 * | 7/2009 | Togami et al. ................. 385/92 |

* cited by examiner

*Primary Examiner* — Ryan Lepisto
*Assistant Examiner* — Jerry Blevins

(57) ABSTRACT

A transceiver module includes a receptacle assembly that isolates the signal ground potential at which an opto-electronic subsystem operates from the chassis ground potential at which the transceiver module housing is maintained, while also helping maintain optical alignment of the system elements. The receptacle assembly can include a receptacle made of metal, a coupling made of metal, and a connector made of a dielectric material. The connector is interposed between the receptacle and the coupling to electrically isolate the signal ground potential of the opto-electronic subsystem from the chassis ground potential of the housing and receptacle. As the metal receptacle is mounted in an opening of the housing, it helps shield the housing against EMI.

6 Claims, 3 Drawing Sheets

OPTICAL TRANSCEIVER MODULE PROVIDING EMI SHIELDING AND ELECTRICAL ISOLATION BETWEEN A SIGNAL GROUND AND A CHASSIS GROUND

CROSS-REFERENCE TO RELATED APPLICATION

U.S. patent application Ser. No. 11/866,536, filed Oct. 3, 2007, entitled "AN OPTICAL RECEPTACLE HAVING AN ELECTRICALLY ISOLATING RING FOR ELECTRICALLY ISOLATING THE SIGNAL GROUND AND THE CHASSIS GROUND IN AN OPTICAL TRANSCEIVER MODULE," is related by subject matter.

BACKGROUND

In an optical communication system, it is typically necessary to couple an optical fiber to a transmitter, receiver or transceiver device. Such a device typically includes one or more optical connectors for this purpose. An optical cable comprising a fiber terminated with a plug can be coupled to the device by inserting the plug into the connector. The transmitter, receiver or transceiver device typically includes an opto-electronic device, such as a light source or light sensor, a receptacle that mates mechanically with the plug in a position in which the fiber end is optically aligned with the opto-electronic device, and a retaining mechanism that inhibits inadvertent unplugging.

Coupling an optical fiber to a transceiver device can be facilitated by modularizing the transceiver device. For example, as illustrated in FIG. 1, a known optical transceiver module 2 has a configuration or form commonly referred to as a Small Transceiver Format or Small Form Factor format. The transceiver module 2 includes a metallic module housing comprising an upper metallic housing portion 13 and a lower metallic housing portion 14 that together form a substantial portion of the module housing. Although the transceiver module 2 includes both a transmitter system and a receiver system in a side-by-side arrangement in the module housing, only the transmitter system is shown in FIG. 1 for purposes of clarity, as the receiver system is similar.

An optical fiber cable that includes a plug 8 and a sheathed fiber 9 having a fiber end retained in a ferrule 12 of plug 8 can be mated with the transceiver module 2 by plugging the plug 8 into a receptacle assembly 5. A latch 15 of the plug 8 latches the plug 8 to the transceiver housing to maintain the plug 8 and the receptacle assembly 5 in locking engagement with each other.

When the plug 8 is mated to the receptacle assembly 5, the ferrule 12 is contained within the receptacle assembly 5. The receptacle assembly 5 is connected to a transmitter subsystem 16 (also commonly referred to as a transmitter package) of the transceiver module 2. Transmitter subsystem 16 has a configuration or form that is typically referred to as a transistor outline (TO)-can. The transmitter subsystem 16 typically contains a laser diode chip, one or more lenses that make up an optics system (not shown), and one or more other electronic components mounted on a transmitter submount assembly (not shown).

When the plug 8 is mated to the receptacle assembly 5, the end of the optical fiber retained in the ferrule 12 is optically aligned with the optics system of the transmitter subsystem 16. Electrical leads 18, 19, 21, 22, etc., pass through the TO header 17 and communicate electrical signals between traces on the transmitter submount assembly and electrical circuitry (not shown) in the transceiver module 2 that is external to the transmitter subsystem 16. An electrical signal ground region 23 on the TO header 17 carries the signal ground for the electrical components of the transmitter subsystem 16. In some types of transceiver modules, a metal enclosure similar to the TO header 17 carries the signal ground. Other electrical components of the transceiver module 2 that are external to the transmitter subsystem 16 are electrically grounded by connecting their ground contacts (not shown) together and to the signal ground region 23 and all together to the upper or lower metallic housing portions 13 and 14, through the metallic receptacle assembly 5. This metallic housing electrical ground connection is referred to as the chassis ground.

In some instances, in order for the transceiver module 2 to operate properly, the signal ground region 23 or other structure that carries the signal ground and the module housing or other structure that carries the chassis ground need to be electrically isolated from each other. However, as the receptacle assembly 5 is normally made of metal and is in direct contact with the housing portions 13 and 14, which are at the chassis ground potential, isolating these grounds from one another can be problematic.

As illustrated in further detail in FIG. 2, the receptacle assembly 5 has a generally cylindrical receptacle 25 that mates with the plug 8 and a generally cylindrical coupling portion 27 that allows the receptacle assembly 5 to be securely attached to the transmitter subsystem 16. Between the receptacle 25 and the coupling portion 27 is a ring-like connector portion 26 defined by a cylindrical portion 26A and flanges 26B and 26C. The connector portion 26 is the part of the receptacle assembly 5 that mechanically mates with mating features of the housing portions 13 and 14. The shape of the connector portion 26 and its attachment to the housing portions 13 and 14 ensures mechanical and optical alignment of the fiber end contained in the ferrule 12 with the optics system of the transmitter subsystem 16. Because the receptacle assembly 5 is made of metal, it provides shielding against electromagnetic interference (EMI), which is desirable. However, because the connector portion 26 of the receptacle 5 is normally in physical contact with the upper and/or lower housing portions 13 and 14, electrically isolating the signal ground from the chassis ground can be problematic.

SUMMARY

Embodiments of the present invention relate to a transceiver module in which an opto-electronic transmitter or receiver system includes a receptacle assembly that isolates the signal ground potential at which an opto-electronic subsystem operates from the chassis ground potential at which the transceiver module housing is maintained, while also helping maintain optical alignment of the system elements. The opto-electronic subsystem can include, in addition to an opto-electronic element such as a light source or light detector, optical elements such as lenses, as well as mechanical structures that secure the optical and opto-electronic elements in optical alignment (e.g., along an optical axis).

The receptacle assembly can include a receptacle made of a conductive material such as metal, a coupling made of a conductive material such as metal, and a connector made of a dielectric material. The connector is interposed between the receptacle and the coupling to electrically isolate them yet maintain sufficient mechanical contact to aid optical alignment of the system. The receptacle is mounted in an opening of the housing and can receive and mate with an optical cable plug. As the receptacle is made of an electrically conductive material, it helps shield the housing opening against entry of EMI. During transceiver operation, the housing and coupling are maintained at chassis ground potential.

The coupling is attached or otherwise mechanically coupled to the opto-electronic subsystem and thus helps maintain the opto-electronic subsystem in optical alignment with other system elements. As the coupling is made of an electrically conductive material, during transceiver operation the coupling is at the same (signal) ground potential as the opto-electronic subsystem to which it is attached. However, as the dielectric connector is disposed between the receptacle and the coupling, the connector electrically insulates or isolates the signal ground potential of the opto-electronic subsystem from the chassis ground potential of the housing and receptacle.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 3:
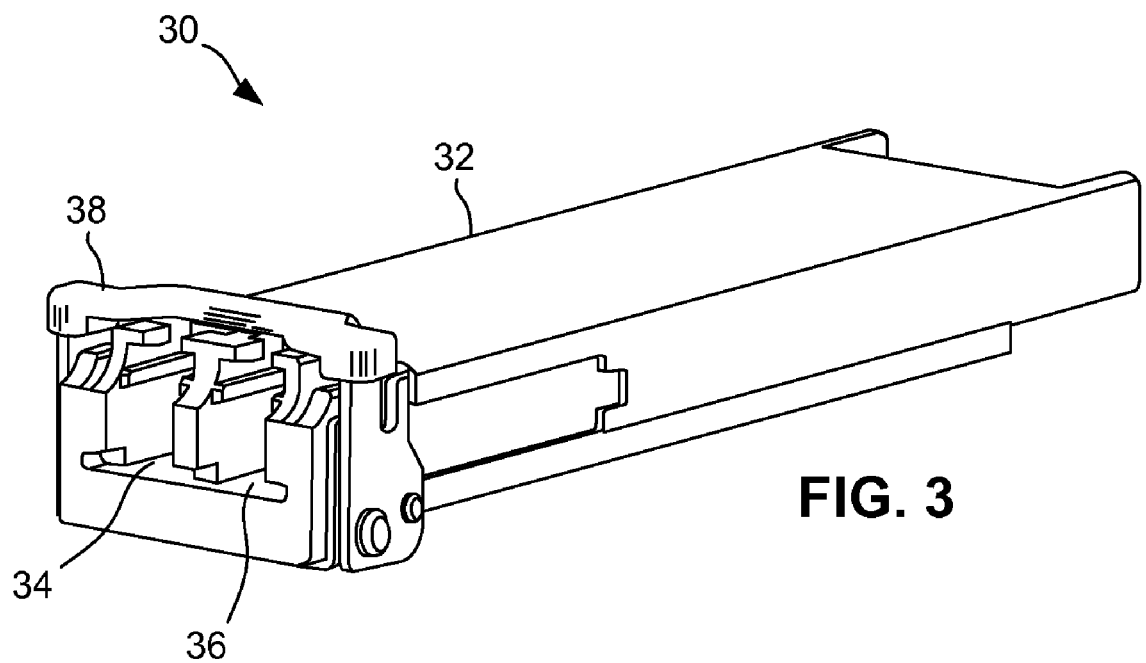
FIG. 3 is a perspective view of an optical transceiver module in accordance with an exemplary embodiment of the invention.
Figure 4:
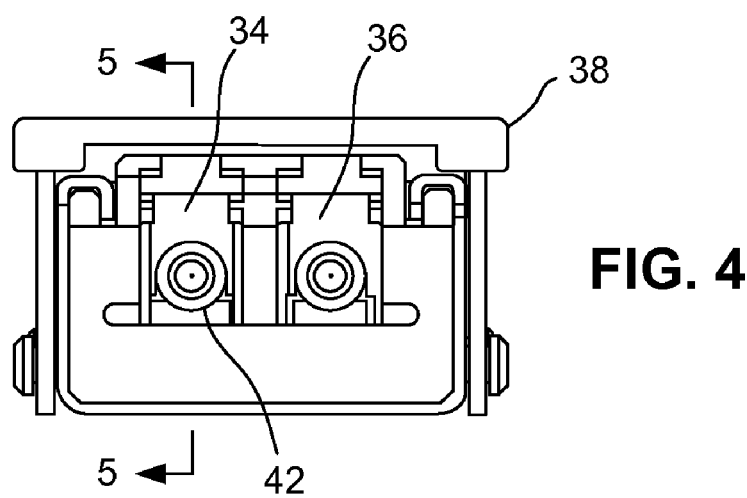
FIG. 4 is a front elevation view of the optical transceiver module of FIG. 3.
Figure 5:
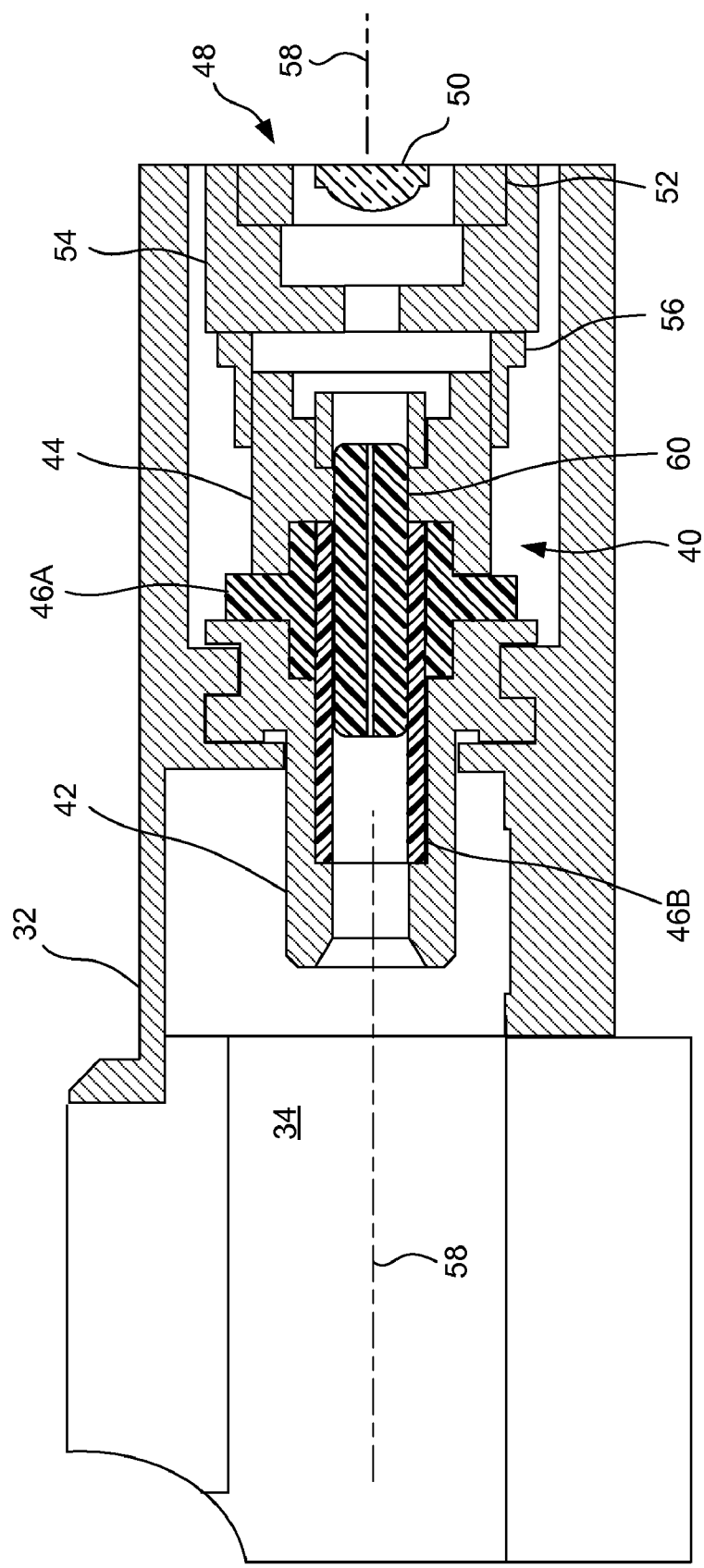
FIG. 5 is a sectional view, taken on line 5-5 of FIG. 4, showing a portion of the optical transceiver module.

As illustrated in FIGS. 3-5, in an exemplary embodiment of the invention, an optical transceiver module 30 has an elongated housing 32 that generally conforms to the configuration or form known as Small Transceiver Format or Small Form Factor. Housing 32 has a transmitter bay 34 that contains an optical transmitter system and a receiver bay 36 that contains an optical receiver system. Transmitter bay 34 and receiver bay 36 are disposed in a side-by-side arrangement, and each extends from a respective opening in the front of housing 32 substantially along the length of housing 32. Although the present invention can be embodied in either an optical transmitter or receiver or both, only an embodiment involving the transmitter system of optical transceiver module 30 is described herein. As the manner in which the invention is embodied in a receiver is essentially the same as that in which it is embodied in a transmitter, persons skilled in the art to which the invention relates will also readily be capable of embodying the invention in the receiver system of transceiver module 30.

Although not shown for purposes of clarity in FIGS. 3-5, the plug of an optical cable can be mated with the transmitter system in a manner similar to that described above with regard to FIG. 1.

A portion of the transmitter system is shown in FIG. 5, with elements not relevant to a description of the exemplary embodiment (such as the mechanism 38 shown in FIGS. 3-4 that can be used to facilitate mounting optical transceiver module 30) omitted for purposes of clarity. A receptacle assembly 40 mounted in transmitter bay 34 includes a receptacle 42 made of a conductive material such as metal, a coupling 44 made of a conductive material such as metal, and a connector 46 (comprising elements 46A and 46B) made of a dielectric material. Connector 46 is interposed between receptacle 42 and coupling 44 to electrically isolate them and thus electrically isolate signal ground from chassis ground, as described in further detail below.

An opto-electronic subsystem 48 is also mounted in transmitter bay 34 and attached to receptacle assembly 40. More specifically, opto-electronic subsystem 48 is attached to coupling 44 of receptacle assembly 40 and thus in both mechanical and electrical contact with coupling 44. Opto-electronic subsystem 48 can include, in addition to an opto-electronic element (not shown) such as a light source or light detector, optical elements such as a lens 50, as well as surrounding mechanical structures 52, 54, 56, etc., which secure the optical and opto-electronic elements in alignment with each other on an optical axis 58.

Figure 1:
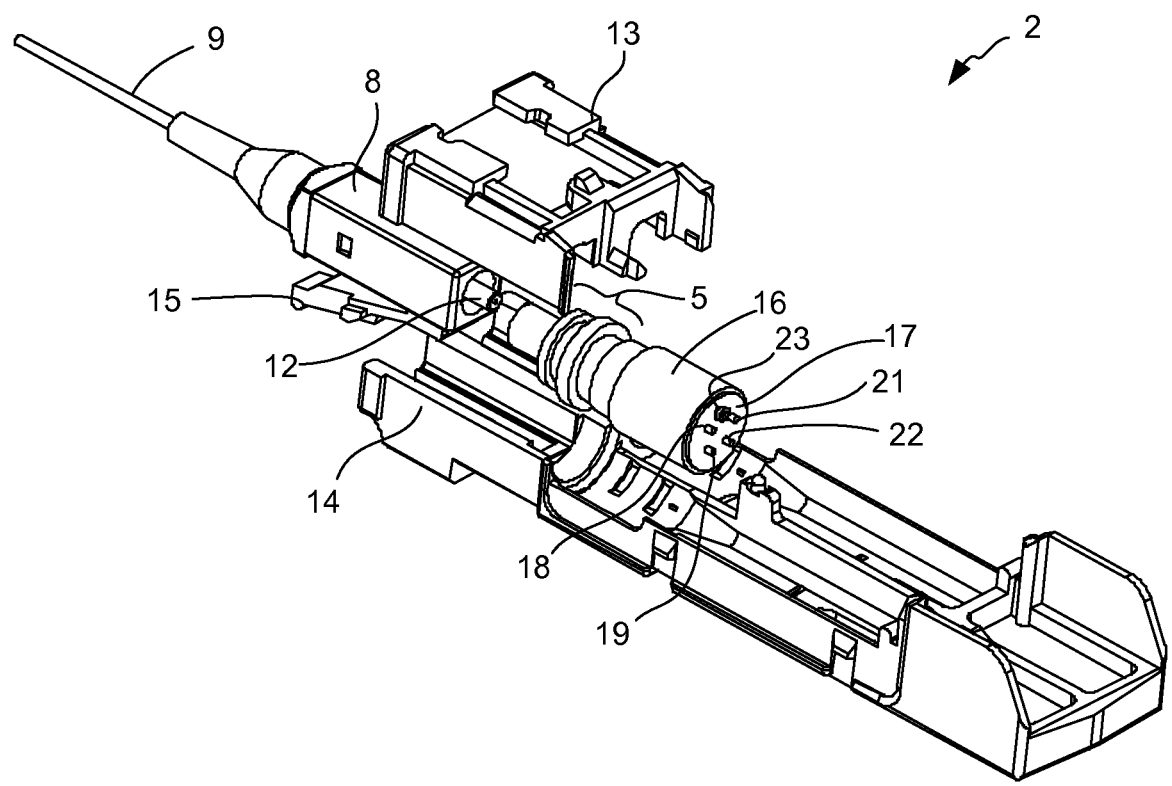
FIG. 1 is a perspective view of an optical transceiver module of a type known in the art.
Figure 2:
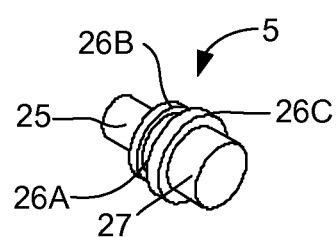
FIG. 2 is a perspective view of a portion of the optical transceiver module of FIG. 1.

When an optical cable similar to that shown in FIG. 1 is plugged into receptacle 42, the ferrule abuts and the fiber end is held within a stop 60, which is also made of a dielectric material. When the transmitter system is in operation, opto-electronic subsystem 48 responds to electrical signals by generating corresponding optical signals, which are optically transmitted through the cavities in receptacle assembly 40 along optical axis 58 and into the fiber end. In operation, structures 52, 54, 56, etc., or other structural elements of opto-electronic subsystem 48 are maintained at a signal ground potential that the electronic elements of opto-electronic subsystem 48 require in order to operate properly. Housing 32, however, is maintained at a chassis ground potential.

One solution to the problem of isolating signal ground and chassis ground in an optical transceiver module is described in co-pending U.S. patent application Ser. No. 11/866,536, filed Oct. 3, 2007, the disclosure of which is incorporated herein in its entirety by this reference. In that solution, a dielectric ring on the connector portion of the receptacle assembly electrically isolates the entire receptacle assembly from the module housing. Although that arrangement achieves isolation of the signal ground from the chassis ground, the opening in the housing in which the receptacle assembly is mounted is not well shielded against electromagnetic interference (EMI) because such EMI can penetrate the dielectric ring.

In the illustrated embodiment of the present invention, connector 46 electrically isolates receptacle 42 from coupling 44 and opto-electronic subsystem 48. As receptacle 42 is made of rigid metal and is both mechanically and electrically coupled to housing 32, it shields the opening in housing 32 in which it is mounted against EMI intrusion as well as holds itself and the elements to which it is connected in rigid alignment with respect to optical axis 58. In addition, as connector 46 is made of a dielectric material such as a plastic, it not only electrically isolates receptacle 42 from coupling 44 and opto-electronic subsystem 48 but helps hold coupling 44 and opto-electronic subsystem 48 in alignment with receptacle 42 and thus with optical axis 58. It is important that mechanical structures 52, 54, 56, etc., of opto-electronic subsystem 48 be made of a rigid material to provide sufficiently precise and stable alignment of the optical elements of electronic subsystem 48 with optical axis 58. A dielectric material of sufficient rigidity for this purpose is typically less economical than an equally rigid metal. Therefore, in accordance with the principles described herein, to economically provide both mechanical stability and electrical isolation of chassis ground from signal ground, the elements that contribute to optical alignment, such as receptacle 42 and coupling 44, are made of metal, while only the connector 46, which plays a lesser (though not insignificant) role in optical alignment, is made of a dielectric material.

One or more illustrative embodiments of the invention have been described above. However, it is to be understood that the invention is defined by the appended claims and is not limited to the specific embodiments described.

What is claimed is:

1. A transceiver module, comprising:
a housing made of an electrically conductive material;
an opto-electronic subsystem mounted in the housing, the opto-electronic subsystem having an optical axis;
a receptacle made of an electrically conductive material, the receptacle mounted in an opening in the housing and mateable with an optical cable plug aligned with the optical axis;
a coupling made of an electrically conductive material, the coupling in mechanical and electrical contact with the opto-electronic subsystem; and
a connector made of a dielectric material, the connector disposed between the receptacle and the coupling and aiding mechanical alignment of the receptacle and the coupling with the optical axis, whereby the connector electrically isolates a chassis ground potential of the housing and receptacle from a signal ground potential of the opto-electronic subsystem.

2. The transceiver module claimed in claim 1, wherein the connector is substantially ring-shaped.

3. The transceiver module claimed in claim 1, wherein:
the receptacle has a cylindrical receptacle body portion with a cylindrical receptacle cavity;
the coupling has a cylindrical coupling body portion with a cylindrical coupling cavity; and
the connector has a first cylindrical portion mating with the receptacle cavity, a second cylindrical portion mating with the coupling cavity, and a flange portion between the first and second cylindrical portions.

4. The transceiver module claimed in claim 3, wherein:
the receptacle is made of metal;
the coupling is made of metal; and
the connector is made of a plastic material.

5. A transceiver module, comprising:
a housing made of an electrically conductive material, the housing elongated in a direction of a housing axis;
an elongated opto-electronic transmitter system in the housing extending in the direction of the housing axis; and
an elongated opto-electronic receiver system in the housing extending in the direction of the housing axis;
wherein at least one of the transmitter system and receiver system comprises:
an opto-electronic subsystem having an optical axis oriented in the direction of the housing axis;
a receptacle made of an electrically conductive material, the receptacle mounted in an opening in the housing and mateable with an optical cable plug aligned with the optical axis;
a coupling made of an electrically conductive material, the coupling in mechanical and electrical contact with the opto-electronic subsystem; and
a connector made of a dielectric material, the connector disposed between the receptacle and aiding mechanical alignment of the receptacle and the coupling with the optical axis, whereby the connector electrically isolates a chassis ground potential of the housing and receptacle from a signal ground potential of the opto-electronic subsystem.

6. A method of operation of a transceiver module, the transceiver module comprising a housing made of an electrically conductive material, an opto-electronic subsystem, a receptacle made of an electrically conductive material and mounted in an opening in the housing, a coupling made of an electrically conductive material and in mechanical and electrical contact with the opto-electronic subsystem, and a connector made of a dielectric material and disposed between the receptacle and the coupling, the method of operation comprising:
mating an optical cable with the receptacle; and
operating the opto-electronic subsystem to communicate an optical signal between the opto-electronic subsystem and the optical cable, the opto-electronic subsystem having a node coupled to a signal ground potential, and the housing and the receptacle coupled to a chassis ground potential;
wherein the connector electrically isolates the signal ground potential from the chassis ground potential while aiding mechanical alignment of the receptacle and the coupling with the opto-electronic subsystem.

* * * * *